US012209769B2

(12) United States Patent
Frambot

(10) Patent No.: US 12,209,769 B2
(45) Date of Patent: Jan. 28, 2025

(54) AIR FLOW COOLING AND HUMIDIFYING SYSTEM AND CLEANING METHOD FOR AN EVAPORATION PANEL OF SUCH A SYSTEM

(71) Applicant: DEVATEC, Offranville (FR)

(72) Inventor: Jean-François Frambot, Allouville-Bellefosse (FR)

(73) Assignee: DEVATEC, Offranville (FR)

( * ) Notice: Subject to any disclaimer, the term of this patent is extended or adjusted under 35 U.S.C. 154(b) by 251 days.

(21) Appl. No.: 17/855,771

(22) Filed: Jun. 30, 2022

(65) Prior Publication Data

US 2023/0003401 A1 Jan. 5, 2023

(30) Foreign Application Priority Data

Jul. 1, 2021 (EP) .................................... 21305910

(51) Int. Cl.
*F24F 6/04* (2006.01)
*B08B 3/04* (2006.01)
*B08B 13/00* (2006.01)

(52) U.S. Cl.
CPC .................. *F24F 6/04* (2013.01); *B08B 3/04* (2013.01); *B08B 13/00* (2013.01); *F24F 2221/225* (2013.01)

(58) Field of Classification Search
CPC ............. F24F 11/0008; F24F 2221/225; F24F 2221/22; F24F 3/16; F24F 5/0035; B08B 3/04
See application file for complete search history.

(56) References Cited

U.S. PATENT DOCUMENTS 3,339,902 A 9/1967 Martin
3,395,900 A 8/1968 Meek et al.
4,145,384 A 3/1979 Wagaman et al.
10,955,156 B1 * 3/2021 Kreuger .................... F24F 6/04
2013/0233005 A1 * 9/2013 Gilbert ...................... F28D 5/02
62/186

FOREIGN PATENT DOCUMENTS

EP 3271660 A1 * 1/2018 ................ F24F 6/04
KR 10-2019-0069202 A 6/2019

OTHER PUBLICATIONS

Search Report for EP 21 30 5910, dated Dec. 20, 2021.

* cited by examiner

*Primary Examiner* — Frantz F Jules
*Assistant Examiner* — Martha Tadesse
(74) *Attorney, Agent, or Firm* — MARSHALL, GERSTEIN & BORUN LLP

(57) ABSTRACT

A system for humidifying and cooling an air flow and includes a frame, porous evaporation panels mounted on the frame, water dispersing elements arranged above the panels and a supply system including a control unit configured to supply water to the dispersing elements. The control unit includes the control elements that can be independently controlled from each other between an evaporation configuration wherein the water supply flow-rate is equal to a flow-rate of the water that is evaporated through the associated porous evaporation panel, and a cleaning configuration wherein the water supply flow-rate is greater than a flow-rate of the water that is evaporated through the porous evaporation panel, so as to create a water flow.

14 Claims, 5 Drawing Sheets

AIR FLOW COOLING AND HUMIDIFYING SYSTEM AND CLEANING METHOD FOR AN EVAPORATION PANEL OF SUCH A SYSTEM

TECHNICAL FIELD

The present invention relates, according to a first aspect, to an air flow cooling and humidifying system, said system comprising:

- a frame delimiting an inlet, an outlet and a passage between the inlet and the outlet, where the air flow is intended to pass through the passage,
- a plurality of porous evaporation panels mounted on the frame and arranged within the passage, where each porous evaporation panel extends mainly along a substantially vertical direction,
- a plurality of water dispersing elements, each dispersing element being positioned above a corresponding porous evaporation panel, each of the dispersing elements being suitable for dispersing a volume of water on the corresponding porous evaporation panel so as to soak up at least one portion of said porous evaporation panel with the volume of water, the soaked portion comprising at least one exchange surface intended to be in contact with the air flow and to allow the volume of water to evaporate, a total exchange surface being formed by the sum of the exchange surfaces of each of the evaporation panels,
- a supply system comprising a control unit configured to supply the dispersing elements with water at corresponding supply flow-rates.

BACKGROUND

This type of humidifying and cooling system allows water to evaporate through an adiabatic process. As the air flow passes through water-soaked porous evaporation panels, the water in the evaporation panels is evaporated without needing an external energy source. The heat required for water vaporization is provided directly by the air. In this way, the air flow is cooled and the moisture level thereof increases.

The water supply system is used to control the water supply to the evaporation panels according to a setpoint, such as to maintain, e.g. a substantially constant moisture level, to increase or to reduce the moisture level in the room wherein the humidifying and cooling system is located. The control of the moisture level leads to maintaining, increasing or reducing the total exchange surface area of the system.

The position of the interface between the soaked portion and the dry portion of each of the evaporation panels varies during system operation.

The water dispersed over the evaporation panels still contains a fraction of minerals, even when same is deionized or permeated. The evaporation mechanism leads to the deposition of said minerals on the evaporation panels, more particularly at the interface between the soaked portion and the dry portion of each panel. This build-up of minerals harms the evaporation panels by reducing the porosity of the panels and thus reducing the efficiency thereof.

One object of the present invention is to provide a humidifying and cooling system for the regular cleaning of the evaporation panels while maintaining a control over the humidifying level and cooling during said cleaning phases.

SUMMARY

For this purpose, the present invention relates to a humidifying and cooling system of the above-cited type, wherein the control unit comprises a plurality of control elements configured to control correspondingly, each of the supply flows, where the control elements can be controlled independently of each other between at least one evaporation configuration wherein the water supply flow-rate is substantially equal to a flow-rate of the water evaporated through the associated porous evaporation panel, and a cleaning configuration wherein the water supply flow-rate is greater than a flow-rate of the water that is evaporated through the associated porous evaporation panel that is completely soaked so as to result in water flowing out of the associated porous evaporation panel.

In this way, the dispersing elements can be supplied independently of each other depending on the total exchange surface area required. In the evaporation configuration, the supply flow-rate creates a flow outside the evaporation panel at the bottom of the panel, dragging along by gravity, the minerals deposited on the evaporation panel. Said flow does not change the evaporation conditions of the evaporation panel and thus allows the evaporation panel to be cleaned. In this way, by controlling the configuration of the different control elements independently of each other, it is possible to clean the various porous evaporation panels while providing a precise control over the moisture level of the ambient air.

According to different or supplementary embodiments, the humidifying and cooling system further includes one or more of the following characteristics, taken individually or according to all possible combinations:

- each control element is furthermore controllable between the evaporation configuration, the cleaning configuration and a closed configuration wherein the supply flow-rate is zero,
- in the evaporation configuration, the supply flow-rate is controllable so as to increase or decrease the exchange surface area of the porous evaporation panel,
- in the cleaning configuration, the water supply flow-rate is 1.5 times to 2.5 times greater than the water flow-rate evaporated through the associated evaporation panel,
- the supply system comprises a plurality of water supply lines, each supply line being fluidically connected to a corresponding dispersing element, each control element being connected to a corresponding supply line,
- the control unit is configured for controlling the water supply flow-rates according to a setpoint,
- the supply system further includes a water collection recipient placed under the porous evaporation panels for collecting the water flow.

According to a second aspect, the invention relates to a method for cleaning at least one porous evaporation panel of an air flow cooling and humidifying system as described above, the system comprising at least a first and a second porous evaporation panel, a first and a second water dispersing element, and a first and a second control element, the method comprising the following steps:

- supplying the first dispersing element with water, the first control element being in the evaporation configuration, the first evaporation panel being partially soaked,
- increasing the total exchange surface area by controlling the first supply flow-rate until the whole first evaporation panel is soaked,
- when the first porous evaporation panel is completely soaked, supplying the second dispersing element with water, the second control element being in the evaporation configuration,
- supplying the first dispersing element with water at a first supply flow-rate greater than a flow-rate of the water evaporated through the first completely soaked porous evaporation panel so as to lead to water flowing out from said porous evaporation panel, where the first control element is in the cleaning configuration.

According to different or supplementary embodiments, the method also includes one or more of the following characteristics, taken individually or in all possible combinations:

the system comprises at least a third panel, a third water dispersing element, and a third control element, the method comprising the following steps:

increasing the total exchange surface area by controlling the second supply flow-rate until the whole second evaporation panel is soaked, when the second porous evaporation panel is completely soaked, supplying the third dispersing element with water, the third control element being in the evaporation configuration, supplying the second dispersing element with water with a second supply flow-rate greater than a flow-rate of the water evaporated through the second completely soaked porous evaporation panel so as to lead to water flowing out from said porous evaporation panel, with the second control element in the cleaning configuration, the method involves the following step: reducing the total exchange surface area by controlling the water supply flow-rate of the first dispersing element so as to reduce the exchange surface area of the first evaporation panel, the system comprises at least a fourth panel, a fourth water dispersing element, and a fourth control element, the method comprising the following steps:

stopping the water supply to the first dispersing element, the first control element being in the closed position, increasing the total exchange surface area by supplying the fourth water dispersing element with water, the fourth control element being in the evaporation configuration.

BRIEF DESCRIPTION OF THE DRAWINGS

Other aspects and advantages of the invention will appear upon the reading of the following description, given as an example and in reference to the annexed figures, amongst which.

DETAILED DESCRIPTION OF EMBODIMENTS

Figure 1:
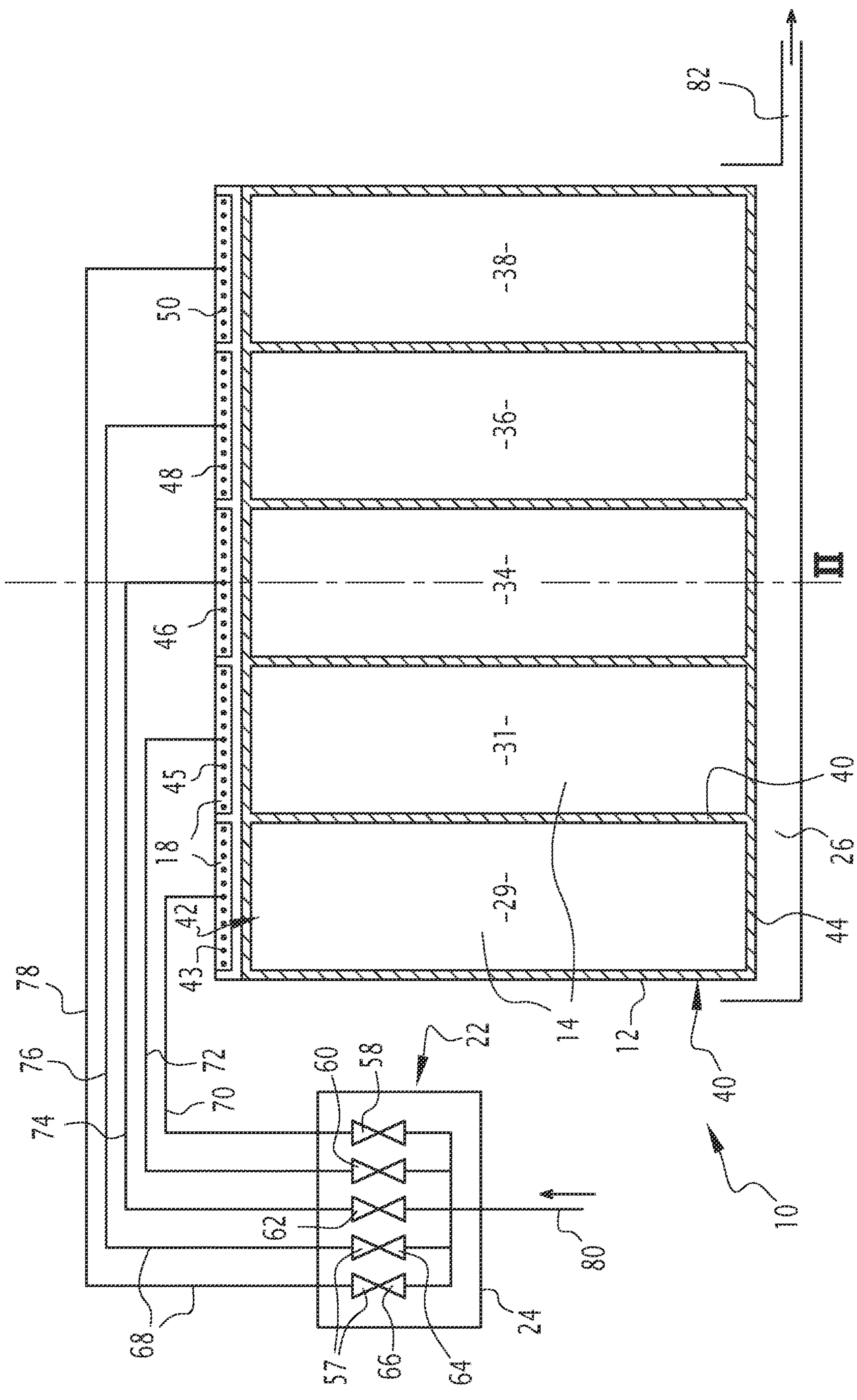
FIG. 1 is a schematic representation of a cooling and humidifying system according to the invention.

FIG. 1 is a schematic representation of a humidifying and cooling system 10 according to the present invention.

The system 10 comprises a frame 12, a plurality of porous evaporation panels 14 mounted on the frame 12, a plurality of water dispersing elements 18 and a supply system 22 comprising a control unit 24 configured to supply each water dispersing element with a corresponding supply flow-rate. Preferentially, the supply system 22 further includes a water collection recipient 26 placed under the evaporation panels 14.

Figure 2:
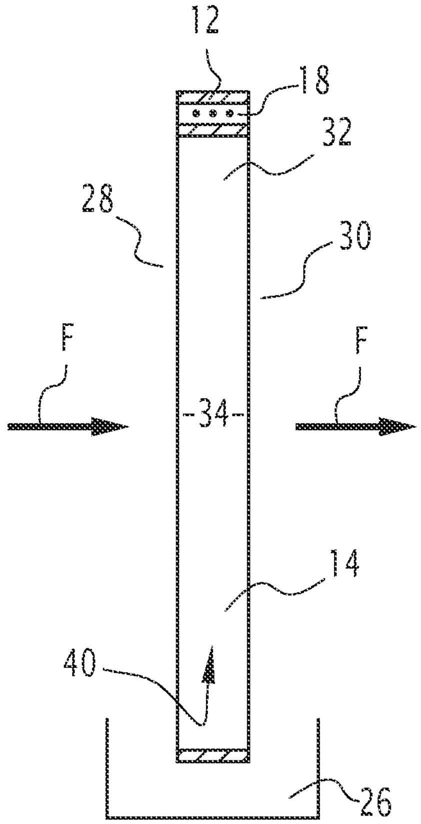
FIG. 2 is a schematic cross-section of the system in FIG. 1, FIGS. 3 to 5 are schematic representations of the humidifying and cooling system in FIG. 1 for three distinct operating states.

As shown in FIG. 2, the frame 12 delimits an inlet 28, an outlet 30, and a passage 32 from the inlet 28 to the outlet 30. Preferentially, the inlet 28 extends into a first elevation plane and the outlet 30 extends into a second elevation plane substantially parallel to the first elevation plane. During the operation of the system 10, the first elevation plane and the second elevation plane are substantially parallel to a vertical plane. The surface area of the inlet 28 and the surface area of outlet 30 are preferentially substantially identical. The inlet 28 and the outlet 30, e.g. have a substantially rectangular shape. The frame 12 is made, e.g. of steel.

The number of porous evaporation panels 14 is comprised, e.g. between two and twenty, e.g. five as shown in FIGS. 1 to 5. In particular, in the example in FIGS. 1 to 5, the system 10 includes a first porous evaporation panel 29, a second porous evaporation panel 31, a third porous evaporation panel 34, a fourth porous evaporation panel 36 and a fifth porous evaporation panel 38.

The porous evaporation panels 14 are preferentially aligned next to each other along a direction substantially perpendicular to an elevation direction. The elevation direction is substantially merged with a vertical direction when the system 10 according to the invention, is in operation.

In a variant (not shown), the porous evaporation panels 14 are aligned along the elevation direction.

In another variant (not shown), the system 10 comprises a first row of porous evaporation panels 14 extending in a first direction substantially perpendicular to the elevation direction, and a second row of porous evaporation panels 14 extending in a second direction substantially parallel to the first direction, the first direction and the second direction extending in the same elevation plane.

Each porous evaporation panel 14 mainly extends along an elongation direction that is substantially parallel to the elevation direction.

Preferentially, the porous evaporation panels 14 are identical to each other.

Each porous evaporation panel is mounted on the frame 12 inside the passage 32, between the inlet 28 and the outlet 30.

Preferentially, the porous evaporation panels 14 are mounted on the frame 12 in a removable manner, i.e. the porous evaporation panels 14 can be separated from the frame 12 and extracted out of the passage 32 e.g. during installation operations. The porous evaporation panels 14 are extracted from the frame 12, e.g. along a direction of extraction that is substantially parallel to the first and second planes. In a variant, the porous evaporation panels 14 are extracted along an extraction direction that is substantially perpendicular to the first and second planes.

In this way, an air flow F that enters through the inlet 28 of the frame 12, upstream of the passage 32, flows across the passage 32 through the porous evaporation panels 14 and exits through the outlet 30, downstream of the passage 32, having evaporated a quantity of water present in the porous evaporation panel(s) 14, as discussed in detail further down in the description. The air flow F flows across the porous evaporation panels 14 along a direction that is substantially perpendicular to the main elongation direction of the porous evaporation panels 14.

The porous evaporation panels 14 are mounted on the frame 12 in such a way that the air flow F which flows through the passage 32 flows necessarily through one of the porous evaporation panels 14.

Each porous evaporation panel 14 has a shape which is, e.g. substantially parallelepipedal. Each panel 14 has two lateral surfaces 40 which are opposite to each other, one upper surface 42, one lower surface 44 opposite to the upper surface 42, both connected to the lateral surfaces 40. The lateral surfaces 40 extend in a plane substantially parallel to the first plane and to the second plane. The upper surface 42 and the lower surface 44 extend in planes that are substantially perpendicular to the first plane and to the second plane.

Each panel 14 comprises, e.g. a plurality of corrugated sheets of non-organic fibers, e.g. glass fibers, assembled together to form flow channels for the air flow F. Preferentially, the thickness of each corrugated sheet is between 0.1 mm and 0.6 mm, e.g. 0.3 mm. The channel ripple period is preferentially between 3 mm and 25 mm, e.g. 10 mm. The height of the corrugations is preferentially comprised between 2 mm and 10 mm, e. g. 5 mm.

Each water dispersing element 18 is placed above a corresponding porous evaporation panel 14 along the elevation direction.

In general, the system 10 comprises as many water dispersing elements 18 as porous evaporation panels 14. Thus, in the example shown in FIGS. 1 to 5, the system 10 comprises five water dispersing elements 18, a first dispersing element 43, a second dispersing element 45, a third dispersing element 46, a fourth dispersing element 48 and a fifth dispersing element 50, respectively, arranged above each of the five porous evaporation panels 14.

Figure 3:
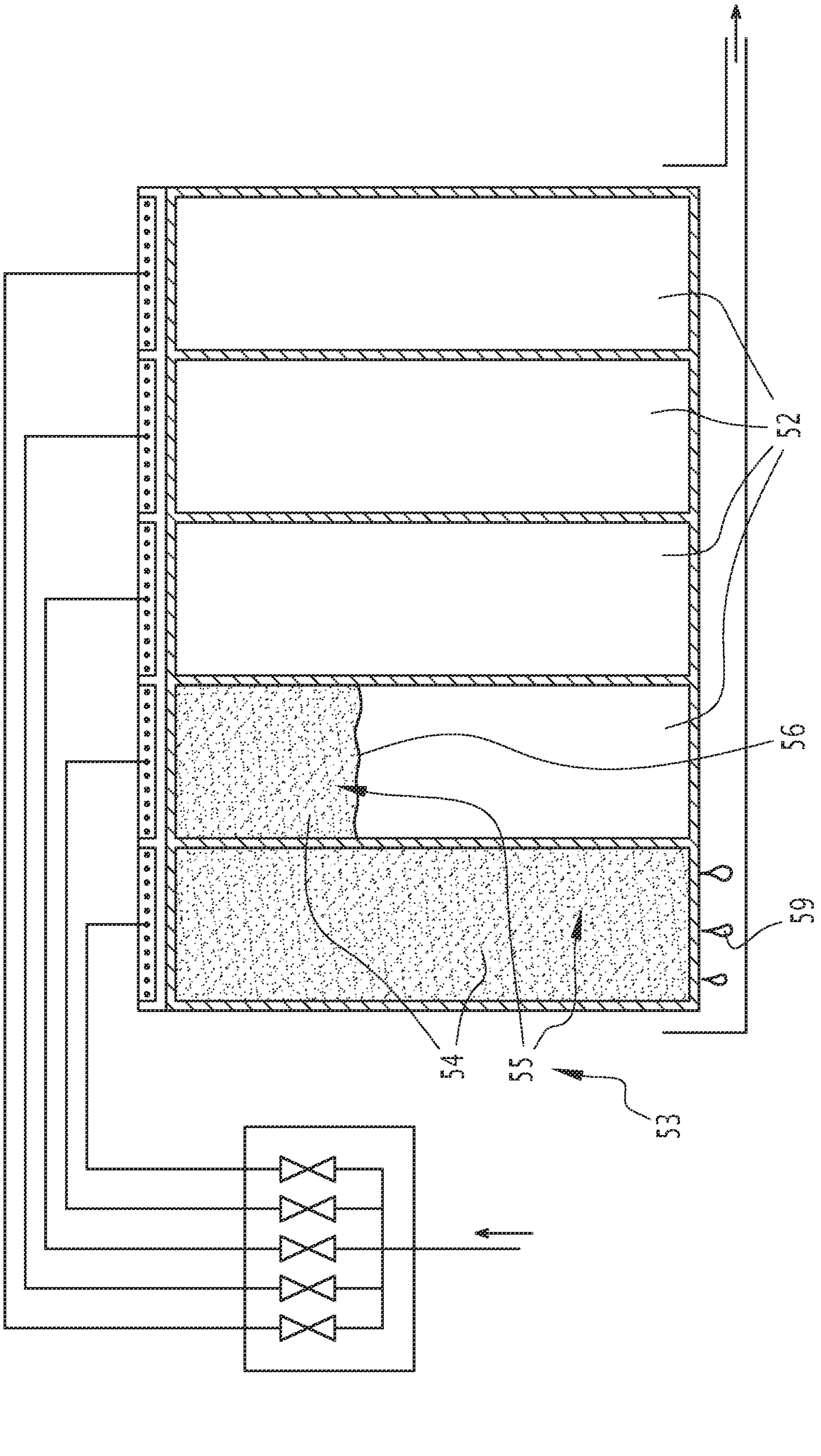
Figure 4:
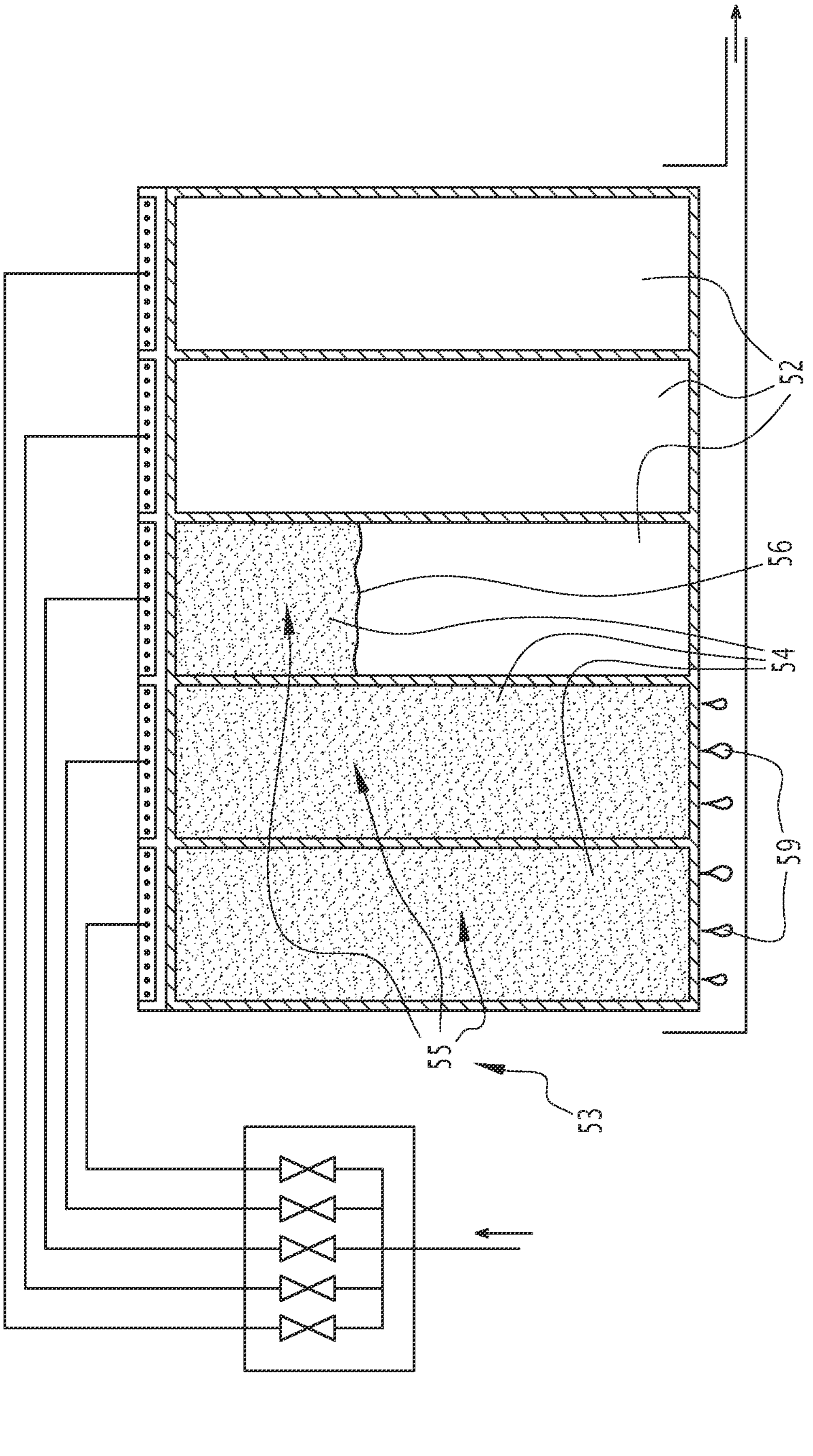
Figure 5:
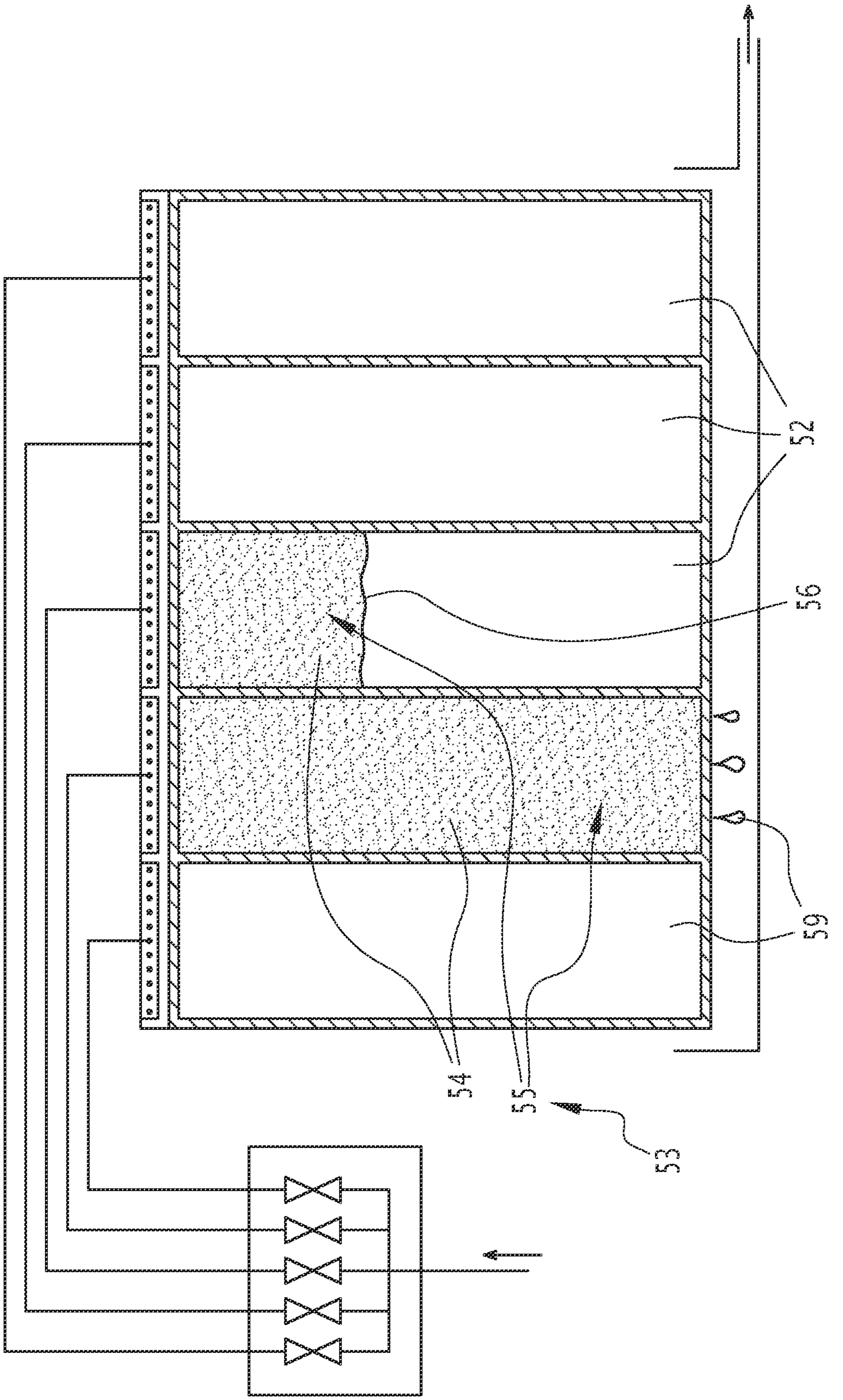

Each dispersing element 18 is suitable for dispersing a volume of water over the corresponding evaporation panel 14 so as to soak at least one portion 54 of said evaporation panel 14 with the volume of water (FIGS. 3 to 5). In particular, the water dispersing element 18 disperses the volume of water over the upper surface 42 of the evaporation panel 14. The volume of water soaks by gravity, the evaporation panel 14 from an upper part of the panel 14 toward a lower part of the panel 14. The evaporation panel 14 comprises a dry portion 52 and a soaked portion 54 separated by an interface 56, as shown in particular in FIG. 3. The position of the interface 56 depends in particular on the volume of water dispersed by the water dispersing element 18, and in particular on the supply flow-rate that supplies the dispersing element 18, and on the evaporation conditions, i.e. on the temperature and the ambient humidity around the system.

The volume of water in the soaked portion 54 of the porous evaporation panel 14 is intended to be evaporated through the passage of the air flow F through the porous evaporation panel 14. The air flow F is then cooled and humidified.

The soaked portion 54 comprises at least one exchange surface area 55 in contact with the air flow F allowing the volume of water to evaporate.

A total exchange surface area 53 of the system is formed by the sum of the exchange surfaces of each of the soaked portions 54 of each of the evaporation panels 14.

Preferentially, each water dispersing element 18 is formed by a dispersion ramp extending primarily along a direction substantially perpendicular to the main direction of extension of the evaporation panel 14, so that the water is dispersed uniformly over the upper surface 42 of the evaporation panel 14.

In the example shown, the control unit 24 is configured to supply the first dispersing element 43 with water at a first supply flow-rate, the second dispersing element 45 with a second supply flow-rate, the third dispersing element 46 with a third supply flow-rate, the fourth dispersing element 48 with a fourth supply flow-rate and the fifth dispersing element 50 with a fifth supply flow-rate.

According to the invention, the control unit 24 comprises a plurality of control elements 57 configured to control each of the water supply flow-rates, respectively. The operating elements 57 can be controlled independently of each other. In other words, the control unit 24, through the control elements 57, can control the different supply flow-rates independently of each other.

Each control element 57 is, e.g. a regulator valve. The ratio between the minimum flow-rate of the valve and the maximum flow-rate of the valve is very high, generally greater than 30.

In the example of FIGS. 1 to 5, the control unit 24 comprises a first control element 58, a second control element 60, a third control element 62, a fourth control element 64 and a fifth control element 66.

Each of the control elements 57 is controllable between at least one evaporation configuration wherein the water supply flow-rate is substantially equal to a flow-rate of the water evaporated through the associated porous evaporation panel 14, and a cleaning configuration wherein the water supply flow-rate is greater than a flow-rate of the water evaporated through the completely soaked associated porous evaporation panel 14 so that a flow-rate of the water 59 is generated, flowing outside the associated porous evaporation panel 14.

Preferentially, each control element 57 is further controllable between the evaporation configuration, the cleaning configuration, and a closed configuration wherein the supply flow-rate is zero.

In the evaporation configuration, the supply rate is controllable so as to increase or decrease the exchange surface area 55 of the porous evaporation panel 14, i.e. to increase or decrease the volume of the soaked portion 54 of the evaporation panel 14. In the evaporation configuration, the supply rate is, e.g. comprised between 1 l/h and 50 l/h.

In the evaporation configuration, the evaporation panel 14 always includes at least one portion 54 soaked with water.

In the cleaning configuration, the water supply flow-rate is used to generate by gravity, a water flow 59 at the lower part of the evaporation panel 14. The flow 59 drags along the minerals deposited on the evaporation panel 14.

Preferentially, in the cleaning configuration, the water supply flow-rate is 1.5 times to 2.5 times greater than the flow-rate of the water evaporated from the associated evaporation panel. In the cleaning configuration, the evaporation panel 14 is completely soaked with water. The exchange surface area 55 is maximum.

The water dispersed by dispersing elements 18 is, e.g. mains water, permeated water or deionized water. The conductivity of permeated water, e.g. is between 1 μS/cm and 50 μS/cm. The conductivity of deionized water is typically between 0.1 μS/cm and 1 μS/cm.

The supply system 22 preferentially comprises a plurality of water supply lines 68. Each supply line 68 is fluidically connected to a corresponding water dispersing element 18. The supply system comprises as many supply lines 68 as dispersing elements 18. In the example shown, the supply system 22 consists of five supply lines 68, one first supply line 70, one second supply line 72, one third supply line 74, one fourth supply line 76, and one fifth supply line 78, respectively, connected to the first dispersing element 43, second dispersing element 45, third dispersing element 46, fourth dispersing element 48 and fifth dispersing element 50, respectively.

Each control element 57 is connected to a corresponding supply line 68 so as to check the supply flow-rate provided by the water supply line 68.

Each of the supply lines 68 is fluidically connected to a source of fluids 80, preferentially to one source of fluids, e. g. formed by an incoming water mains or a reservoir. In this way, each of the control elements 57 is arranged between the source of fluids 80 and the corresponding water dispersing element on the corresponding supply line 68.

The control unit 24 is advantageously configured to control each of the water supply flow-rates according to a setpoint value. Preferentially, the control unit 24 is regulated by the setpoint value. In this way, the system 10 according to the present invention, is used, e.g. to maintain a constant humidity and/or a substantially constant temperature over time, in the room wherein the system is located.

The humidity and/or temperature are controlled by the total exchange surface area 53 of the evaporation panels 14, i.e. the total volume of the water-soaked portions of the panels 14 in contact with the air. Depending on conditions outside the system 10, maintaining the setpoint requires maintaining, increasing or decreasing the total exchange surface area 53.

The water collection recipient 26 is located under the porous evaporation panels 14 and is used to collect the water flow(s) 59 coming from the lower surface 44 of the evaporation panels 14. The recipient 26 is, e.g. fluidically connected to an outlet line 82 configured to drain the collected water and minerals.

A method for cleaning at least one porous evaporation panel 14 of a cooling and humidifying system 10 for an air flow F as described above, will now be described with reference to FIGS. 3 to 5.

The method involves a first step of supplying water to the first dispersing element 43 of the first evaporation panel 29 so as to soak at least part of the first evaporation panel 29. The first control element 58 is then in the evaporation configuration.

When the maintaining of the setpoint value requires an increase in the total exchange surface area 53, the first supply flow-rate is increased so as to increase the volume of the soaked portion 54 of the first evaporation panel 29 until the entire first evaporation panel 29 is soaked. At this stage, the other control elements 60, 62, 64, 66 are in the closed configuration, i.e. the other dispersing elements 45, 46, 48, 50 are not supplied with water.

If necessary, i.e. if the maintenance of the setpoint requires that the total exchange surface area 53 increases further, when the first evaporation panel 29 is completely soaked, the second dispersing element 45 is supplied with water. The second control element 60 is then in the evaporation configuration. A portion of the second panel 29 is soaked.

The first dispersing element 43 is then supplied with a first supply flow-rate greater than a flow-rate of the water evaporated through the first completely soaked porous evaporation panel 29. In other words, the first control element 58 is in the cleaning configuration. In this way, a flow of water 59 is created at lower part of the first panel 29, said flow dragging along the minerals deposited on the first panel 29. The flow 59 and the minerals are collected in the collection recipient 26. The other control elements, i.e. the third control element 62, the fourth control element 64 and the fifth control element 66 are in the closed configuration.

Such a state is shown in FIG. 3. Maintaining the setpoint requires that the total exchange surface area 53 is greater than 20% of the maximum total exchange surface area, i.e. more than one evaporation panel must be completely soaked.

If need be, the total exchange surface area 53 is increased by controlling the second supply flow-rate until the whole second evaporation panel 31 is soaked. When the second evaporation panel 31 is then completely soaked, the third dispersing element 46 is supplied with water by positioning the third control element 62 in the evaporation configuration.

The second dispersing element 45 is then supplied with water by a second supply flow-rate greater than a flow-rate of the water evaporated through the second completely soaked porous evaporation panel 31 so as to create a water flow 59 outside of the second evaporation panel 31. The second actuator 60 is now in the cleaning configuration.

At this stage, as shown in FIG. 4, the first and second control elements 58, 60 are in the cleaning configuration allowing the first and second evaporation panels 29, 31 to be cleaned. The third control element 46 is used to adjust the total exchange surface area 53 (FIG. 4) of the system 10.

In general, in order to increase the total exchange surface area 53 of the system 10, the dispersing elements 18 are successively supplied one after another as soon as an evaporation panel 14 is completely soaked. Each time that an evaporation panel 14 is completely soaked, the corresponding control element 57 is switched into the cleaning configuration so as to allow the associated panel 14 to be cleaned.

Returning to the state shown in FIG. 4, if maintaining the setpoint value requires a reduction in the total exchange surface area 53, the first supply flow-rate is controlled so that the first evaporation panel 29 is partially soaked. In other words, the first control element 58 is moved into the evaporation configuration. The second control element 60 is maintained in the cleaning configuration making it possible to continue the cleaning of the second evaporation panel 31.

If need be, if it is necessary to further reduce the total exchange surface area 53, e. g. so that same represents less than 40% of the maximum total exchange surface area as shown in FIG. 5, eventually the first water dispersing element 43 being no longer supplied. The first control element 58 is in the closed configuration.

If it is again necessary to increase the total exchange surface area 53, preferentially, the third supply flow-rate is controlled until, if need be, the third evaporation panel 34 becomes completely soaked. When the third evaporation panel 34 is completely soaked, the fourth evaporation panel 36 is supplied with water. The third actuator 62 is in the cleaning configuration allowing the third panel 34 to be cleaned. The fourth control element 64 is in the evaporation configuration.

It is then understood that during the operation of the system 10 according to the invention, it is possible to perform a cleaning of the various porous evaporation panels 14 of the system 10 while maintaining precise control of the level of moisture and of the temperature.

The invention claimed is:

1. A system for humidifying and cooling an air flow, said system comprising: a frame delimiting an inlet, an outlet and a passage between the inlet and the outlet, the air flow being intended to pass through the passage, a plurality of porous evaporation panels mounted on the frame and arranged in the passage, each of the plurality of porous evaporation panels being elongated in a vertical direction, a plurality of water dispersing elements, each of the plurality of dispersing elements being positioned over a corresponding porous evaporation panel, each of the plurality of dispersing elements being suitable for dispersing a volume of water over the corresponding porous evaporation panel so as to soak at least one portion of said porous evaporation panel with the volume of water, the soaked portion comprising at least one exchange surface area intended to be in contact with the air flow and to allow the volume of water to evaporate, a total exchange surface area being formed by a sum of the exchange surface areas of each of the evaporation panels, a supply system comprising a control unit configured to supply water to the dispersing elements with corresponding supply flow-rates, wherein the control unit comprises a plurality of control elements configured to control each of the supply flow-rates, correspondingly, where the control elements being controllable independently of each other between at least one evaporation configuration wherein the water supply flow-rate is substantially equal to a flow-rate of the water evaporated through the associated porous evaporation panel, and a cleaning configuration wherein the water supply flow-rate is greater than the flow-rate of the water evaporated through the associated completely soaked porous evaporation panel so that a water flow is created outside said associated porous evaporation panel.

2. The system according to claim 1, wherein each control element is further controllable between the evaporation configuration, the cleaning configuration and a closed configuration wherein the supply flow-rate is zero.

3. The system according to claim 1, wherein, in the evaporation configuration, the supply flow-rate is controllable so as to increase or decrease the exchange surface area of the porous evaporation panel.

4. The system according to claim 1, wherein, in the cleaning configuration, the water supply flow-rate is 1.5 times to 2.5 times greater than the flow-rate of the water evaporated through the associated evaporation panel.

5. The system according to claim 1, wherein the supply system comprises a plurality of water supply lines, each supply line being fluidically connected to a corresponding dispersing element, each control element being connected to a corresponding supply line.

6. The system according to claim 1, wherein the control unit is configured to control the water supply flow-rates according to a setpoint.

7. The system according to claim 1, wherein the supply system further comprises a water collection recipient placed under the porous evaporation panels intended to collect the water flow.

8. A method for cleaning at least one porous evaporation panel of a system for humidifying and cooling an air flow according to claim 1, the system comprising at least a first and a second porous evaporation panel, a first and a second water dispersing element, and a first and a second control element, the method comprising the following steps:

- supplying water to the first dispersing element, the first control element being in the evaporation configuration, the first evaporation panel being partially soaked,
- increasing the total exchange surface area by controlling the first supply flow-rate until the first evaporation panel is completely soaked,
- when the first porous evaporation panel is completely soaked, supplying water to the second dispersing element, the second control element being in the evaporation configuration,
- supplying water to the first dispersing element with a first supply flow-rate greater than a flow-rate of the water evaporated through the first completely soaked porous evaporation panel so as to create a water flow outside said porous evaporation panel, the first control element being in the cleaning configuration.

9. The cleaning method according to claim 8, the system comprising at least a third panel, a third water dispersing element, and a third control element, the method comprising the following steps:

- increasing the total exchange surface area by controlling the second supply flow-rate until completely soaking the second evaporation panel,
- when the second porous evaporation panel is completely soaked, supplying water to the third dispersing element, the third control element being in the evaporation configuration, supplying water to the second dispersing element with a second supply flow-rate greater than a flow-rate of the water evaporated through the completely soaked second porous evaporation panel so as to create a water flow outside said porous evaporation panel, the second control element being in the cleaning configuration.

10. The cleaning method according to claim 9, comprising the following step:

- reducing the total exchange surface area by controlling the water supply flow-rate to the first dispersing element so as to reduce the exchange surface area of the first evaporation panel.

11. The cleaning method according to claim 10, the system comprising at least a fourth panel, a fourth water dispersing element, and a fourth control element, the process comprising the following steps:

- stopping the water supply to the first dispersing element, the first control element being in the closed position,
- increasing the total exchange surface area by supplying the fourth water dispersing element with water, the fourth control element being in the evaporation configuration.

12. The cleaning method according to claim 8, comprising controlling the water supply flow-rates according to a setpoint using the control unit.

13. A system for humidifying and cooling an air flow, said system comprising:

- a frame delimiting an inlet, an outlet and a passage between the inlet and the outlet, the air flow being intended to pass through the passage,
- a plurality of porous evaporation panels mounted on the frame and arranged in the passage, each porous evaporation panel being elongated in a vertical direction,
- a plurality of water dispersing elements, each dispersing element being positioned over a corresponding porous evaporation panel, each of the dispersing elements being suitable for dispersing a volume of water over the corresponding porous evaporation panel so as to soak at least one portion of said porous evaporation panel with the volume of water, the soaked portion comprising at least one exchange surface area intended to be in contact with the air flow and to allow the volume of water to evaporate, a total exchange surface area being formed by a sum of the exchange surface areas of each of the evaporation panels,
- a supply system comprising a control unit configured to supply water to the dispersing elements with corresponding supply flow-rates,
- wherein the control unit comprises a plurality of control elements configured to control each of the supply flow-rates, correspondingly, where the control elements being controllable independently of each other between at least one evaporation configuration wherein the water supply flow-rate is substantially equal to a flow-rate of the water evaporated through the associated porous evaporation panel, and a cleaning configuration wherein the water supply flow-rate is greater than the flow-rate of the water evaporated through the associated completely soaked porous evaporation panel so that a water flow is created outside said associated porous evaporation panel, wherein the control unit is configured to control the water supply flow-rates according to a setpoint.

14. The system according to claim 1, wherein the porous evaporation panels are aligned next to each other along a direction substantially perpendicular to the vertical direction, or along the vertical direction.

* * * * *